May 19, 1959  C. C. BAUERLEIN  2,887,255
LIQUID MEASURING DEVICE
Filed June 22, 1956
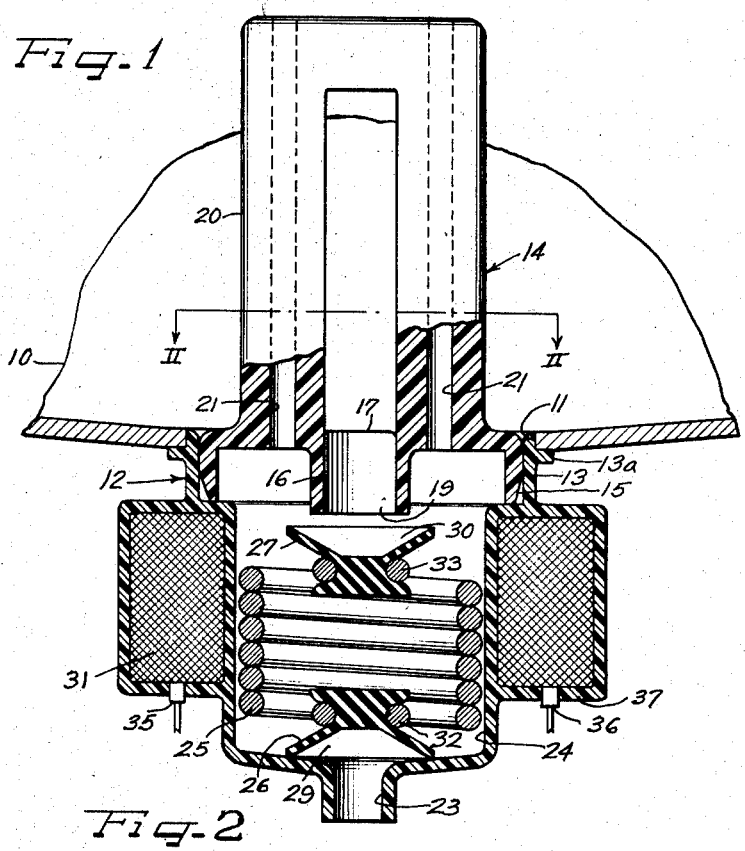
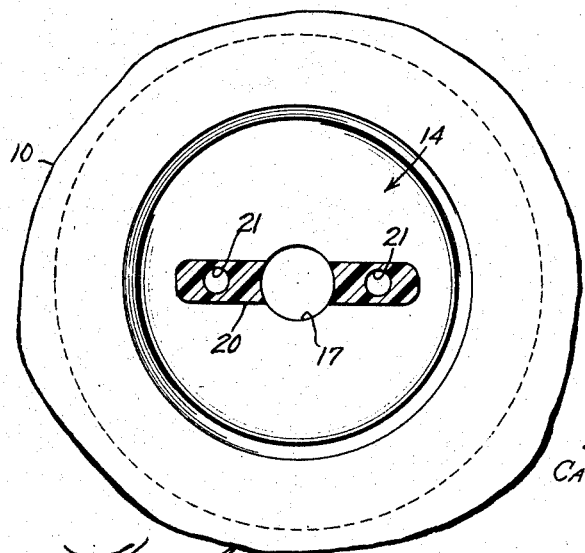
Inventor
CARL C. BAUERLEIN

United States Patent Office 2,887,255
Patented May 19, 1959

2,887,255

LIQUID MEASURING DEVICE

Carl C. Bauerlein, Lincolnwood, Ill., assignor to The Dole Valve Company, Chicago, Ill., a corporation of Illinois Application June 22, 1956, Serial No. 593,178

10 Claims. (Cl. 222—453)

This invention relates to improvements in liquid measuring devices and more particularly relates to such devices as are adapted to measure and dispense a measured volume of detergent for washing machines and the like, although not limited to such use.

A principal object of the invention is to provide a simple and improved form of measuring device arranged with a view toward utmost simplicity and compactness in construction and operation.

Another object of the invention is to provide a measuring and dispensing device of a simple and novel arrangement for measuring and dispensing liquid from a measuring chamber, in which the operating means for measuring and dispensing the liquid is entirely outside of the liquid measuring chamber.

A further object of my invention is to provide a simpler measuring device than formerly, utilizing two oppositely acting measuring valves and eliminating all mechanical connections and springs for operating the valves by the use of an electromagnet encircling the measuring chamber containing the valves.

A still further object of the invention is to provide a liquid measuring and dispensing device having a measuring chamber in fluid communication with a liquid container, in which a measured volume of liquid is admitted to the chamber and allowed to flow therefrom under the control of two oppositely acting valves connected together by a coil-like armature, guided along the wall of the measuring chamber, and in which the valves are operated to shut off the flow of liquid to the measuring chamber and to accommodate the dispensing of a measured volume of liquid therefrom by an electromagnet encircling the measuring chamber and formed as an integral part thereof.

Still another object of the invention is to provide a unitary form of measuring chamber and valve means adapted for sealing connection with a measuring container, having a cap for closing the chamber and forming an inlet thereinto from the chamber and having a handle extending upwardly therefrom having air bleed holes therein for admitting air to the chamber, together with oppositely acting resilient valves and a coiled armature supporting the same in spaced relation with respect to each other and operable to accommodate the dispensing of a measured volume of liquid from the chamber upon the energization of an electromagnet encircling and moulded within said chamber.

These and other objects of the invention will appear from time to time as the following specification proceeds and with reference to the accompanying drawings.

Figure 1 is a partial fragmentary sectional view taken through a liquid measuring device constructed in accordance with the invention, with certain parts thereof broken away; and Figure 2 is a fragmentary sectional view taken substantially along line II—II of Figure 1.

As shown in the drawings:

In Figures 1 and 2 of the drawing, 10 designates a container for liquid to be measured, herein shown as being broken away for illustrative purposes and having an open portion 11 in the bottom thereof adapted to receive the flanged open end portion of a measuring cup or chamber 12. The measuring chamber 12 may be made from a resilient material and, as herein shown, an annular wall 13 of the upper open end portion of said measuring chamber has a flange 13a extending thereabout and spaced beneath the top of said wall, and with the outer side of the wall 13 engages the opening 11 in the container 10 and seals said measuring chamber to said container.

A cap 14 is shown as extending within the open end of the measuring chamber 12 and as pressing the outer side of the wall 13 of said measuring chamber into engagement with the wall of the open portion 11 of the container 10. The cap 14 has an annular wall 15 tapering toward the lower end thereof. The wall 15 at its thickest portion is of a slightly larger diameter than the inside diameter of the wall of the measuring chamber 12, to press the wall of said measuring chamber into engagement with the wall portion of the container 10, defining the open portion 11 in the bottom thereof, to retain said measuring chamber to said container.

The cap 14 has a depending integrally formed central passageway member 16 having an inlet 17 in communication with the bottom of the container 10 and having an outlet 19 opening to the measuring chamber 12. The cap 14 also has an integrally formed handle 20 extending upwardly above the bottom of the container 10 and above the level of the liquid within said container. The handle 20, as herein shown, is in the form of an inverted U and has air vent passageways 21 leading along each leg thereof and opening at their lower ends to the inside of the measuring chamber 12, and to the atmosphere at their upper ends, to vent said measuring chamber and to accommodate the free flow of liquid through an outlet 23 leading from the bottom of said chamber.

The measuring chamber 12 and cap 14 therefor may be made from a thermoplastic material, such as a styrene resin commonly called polystyrene or from various other thermoplastic materials, which are resistant to moisture and have a low dielectric constant.

The measuring chamber 12 is shown as having a generally cylindrical inner wall 24 forming a guide for an armature 25 carrying valves 26 and 27 at opposite ends thereof. The valves 26 and 27 are shown as being resilient valves, which may be made from rubber or from one of the well known substitutes for rubber, and have frusto-conical valve faces 29 and 30, respectively. The valve face 29 faces the outlet 23 and the rim of said face engages the bottom of the measuring chamber 12 by gravity to block the flow of liquid through the outlet 23. The face 30 faces the passageway member 16 and is engageable with the end thereof to block the flow of liquid through the inlet 19 into the measuring chamber 12 upon movement of the armature 25 to another position effected by energization of a magnet coil 31 encircling the outer side of the wall 24.

The armature 25 is shown as being in the form of a wire coil, coiled in the form of a helix of a slightly smaller outer diameter than the diameter of the wall 24, to be guided thereby and to move vertically therealong upon energization and deenergization of the magnet coil 31. As herein shown, the coil 31 has one end portion 32 extending inwardly to a position adjacent the center thereof and coiled about the valve 26 in spaced relation with respect to the frusto-conical face thereof, to secure said valve to said armature and to accommodate free flexing of the frusto-conical face 29 of said valve. An opposite end portion 33 of the helically coiled wire forming the armature 25, is formed in a manner similar to the end portion 32 and is wound about the valve 27 in downwardly spaced relation with respect to the frusto-conical face 30 thereof, to secure said valve to said armature and to accommodate free flexing thereof and provide a tight seal against the end of the passageway member 16 to prevent the flow of liquid into the measuring chamber 12 through the passageway 19, when the electromagnet 31 is energized.

The electromagnet 31 is herein shown as being molded into the chamber 12 into engagement with the outside of the wall 24 and as being completely enclosed within said chamber, so as to prevent moisture from coming in contact with said coil and accommodating the measuring chamber to be contained within a washing machine or dishwasher or the like in contact with the washing fluid. Spade terminals 35 and 36 are provided to conduct current to the magnet coil 31 and effect energization thereof and are herein shown as being molded within a bottom annular wall 37 abutting the bottom of the magnet coil 31 and as projecting through said wall 37 for connection with an energizing circuit, such as a circuit connected with a cyclic timer, timing the periods of energization of the magnet coil 31.

While the measuring device of my invention may be used for various purposes and while the magnet coil 31 may be energized through various forms of electrical energizing and control systems, assuming the spade terminals 35 and 36 are electrically connected to the cyclic timer (not shown) of an automatic washing machine, the valve 26 will normally engage the bottom wall of the measuring chamber 12 by gravity and hold the liquid or detergent to be measured therein. The inlet 19 will then be open to fill the measuring chamber 12 by gravity. When a time in the cycle of operation of the machine is reached when it is necessary to supply detergent to the washing machine in a measured amount, the magnet coil 31 may be energized to engage the face 30 of the valve 27 with the end of the passageway member 16 and block the flow of detergent from the container 10 into the measuring chamber 12. At this time, the valve 26 will be moved out of engagement with the bottom of said measuring chamber and a measured volume of detergent within said chamber will flow through the outlet 23 by gravity. When the chamber is empty, the magnet coil 31 may be deenergized, accommodating the armature 25 to move by gravity along the wall 24 of the measuring chamber 12 and engage the valve 26 with the bottom of said measuring chamber and again block the flow of detergent through the outlet 23, and accommodate detergent to flow into said chamber and fill the same with a measured volume of detergent determined by the volumetric capacity of said chamber.

It may be seen from the foregoing that an extremely simple form of measuring and dispensing device has been provided, eliminating the usual moving parts for operating the measuring and dispensing valves, and utilizing an armature in the form of a coil guided for movement along the measuring chamber as a support means for the inlet and outlet valves of the chamber and for alternately moving the valves to their open and closed positions upon energization of the electromagnet surrounding and molded within the chamber. It may further be seen that the measuring container and electromagnet are molded into a one-piece container with the magnet coil completely enclosed and protected against moisture and from the direct contact of water.

While I have herein shown and described one form in which my invention may be embodied, it will be understood that various modifications and variations thereof may be effected without departing from the spirit and scope of the novel concepts thereof.

I claim as my invention:

1. In a measuring and dispensing device for liquids, a liquid container, a measuring chamber beneath said container, an inlet from said container to said chamber, an outlet leading from the bottom of said chamber, two oppositely facing valves controlling fluid flow through said inlet and said outlet, a helically coiled armature guided for movement along said chamber, connecting said oppositely facing valves and spacing said valves apart a distance less than the distance from said inlet to said outlet, and electrically energizable means on the outside of said measuring chamber energizable to effect the engagement of one valve with said inlet and the disengagement of the other valve from said outlet, to accommodate the flow of a measured volume of liquid from said chamber determined by the volumetric capacity thereof.

2. A liquid measuring and dispensing device comprising a measuring chamber, an inlet into said chamber through the top thereof, an aligned outlet through the bottom of said chamber, an electromagnet encircling said chamber, oppositely facing flexible valves alternately engageable with said inlet and said outlet, and support means for said valves comprising a coiled armature guided for movement along said chamber and carrying said valves at opposite ends thereof and movable upon energization of said electromagnet to engage the uppermost valve with said inlet and to disengage the lowermost valve from said outlet.

3. In a measuring and dispensing device for liquids, a liquid container, a measuring chamber beneath said container, an inlet into the top of said chamber, an outlet leading from the bottom of said chamber, an armature within said chamber guided for movement along the wall thereof, an electromagnet encircling said chamber and energizable to effect movement of said armature upwardly along the wall of said chamber, and two oppositely facing valves carried by said armature at opposite ends thereof and spaced apart a distance less than the distance from said inlet to said outlet, the lower of said valves normally engaging the bottom of said chamber by gravity to accommodate the filling of said chamber by gravity and the upper of said valves being engageable with said inlet to block the flow of liquid into said chamber upon energization of said electromagnet to effect the flow of liquid through said outlet.

4. In a measuring and dispensing device for liquids, a liquid container, a measuring chamber disposed beneath said container, an inlet from said container to said measuring chamber through the top thereof, an outlet leading from the bottom of said chamber in axial alignment with said inlet, a generally cylindrical armature within said chamber and guided by the wall thereof for movement therealong, two opposite facing valves carried at opposite ends of said armature and spaced apart by said armature a distance less than the spacing between said inlet and said outlet, the lowermost of said valves engaging said outlet by gravity to block the flow of liquid therethrough, and an electromagnet surrounding said chamber and energizable to effect movement of said armature upwardly along said chamber into engagement with said inlet and to accommodate the flow of a measured volume of liquid through said outlet determined by the volumetric capacity of said chamber.

5. A liquid measuring and dispensing device comprising a measuring chamber, an inlet into said chamber through the top thereof, an aligned outlet through the bottom of said chamber, an electromagnet surrounding said chamber, oppositely facing flexible valves alternately engageable with said inlet and said outlet, and support means for said valves supporting said valves in lesser spaced relation than the distance between said inlet and said outlet, comprising a helically coiled armature guided for vertical movement along said chamber and having end portions turned to extend to the center of said armature and extending about said valves to retain said valves thereto, said armature moving upwardly along said chamber upon energization of said electromagnet to engage the uppermost of said valves with said inlet and to disengage the lowermost of said valves from said outlet to effect the dispensing of a measured volume of liquid through said outlet determined by the volumetric capacity of said chamber.

6. A liquid measuring and dispensing device comprising a thermoplastic chamber having a generally cylindrical inner wall, an inlet into said chamber through the top thereof, an aligned outlet through the bottom of said chamber, oppositely facing flexible valves alternately engageable with said inlet and said outlet, support means for said valves comprising a helically coiled armature guided for movement along said chamber and having inturned end portions coiled in gripping engagement with said valves, to support said valves in aligned relation in the center of said armature in lesser spaced relation than the distance between said inlet and said outlet, and an electromagnet molded within said chamber and encircling the cylindrical wall thereof to effect movement of said armature upwardly along the wall of said chamber and engage the uppermost of said valves with said inlet and disengage the lowermost of said valves from said outlet to discharge a measured volume of liquid from said chamber upon energization of said electromagnet.

7. A liquid measuring and dispensing device comprising a measuring chamber, an inlet into said chamber through the top thereof, an aligned outlet through the bottom of said chamber, a helically coiled armature guided for movement along said chamber, valve means carried by said armature at opposite ends thereof, concentric with the center of said chamber and facing said inlet and said outlet and spaced apart a distance less than the spacing between said inlet and said outlet, an electromagnet encircling said chamber and energizable to effect movement of said armature upward along said chamber to engage the uppermost of said valve means with said inlet and disengage the lowermost of said valve means from said outlet, and a cover for said chamber having said inlet leading thereinto and having an upright handle having at least one air passageway extending therealong above the level of liquid to be measured, to supply air to said chamber upon engagement of one of said valve means with said inlet and disengagement of the other of said valve means from said outlet to dispense a measured volume of liquid from said chamber.

8. A liquid measuring and dispensing device comprising a container for liquid to be measured having an open bottom portion having a cylindrical wall, a thermoplastic measuring chamber, an inlet into said chamber through the top thereof, an aligned outlet through the bottom of said chamber, a helically coiled armature guided for movement along said chamber, oppositely facing flexible valves supported by said armature in the center thereof in alignment with said inlet and said outlet, an electromagnet encircling said chamber and energizable to move said armature vertically therealong and engage one of said valves with said inlet and disengage the other of said valves from said outlet, and means for retaining said chamber in sealing engagement with said open portion of said container comprising a cover for said chamber engageable with an upper wall portion of said chamber, said cover having an annular wall registerable with the wall portion of said chamber and having a portion of a larger diameter than the wall portion of said chamber when in an unstressed condition and tapering toward its lower end to accommodate insertion of said cover within said chamber to expand the wall portion of said chamber into sealing engagement with said open bottom portion of said container, and said cover having said inlet leading therethrough into said chamber, for conducting liquid from the bottom of said container to fill said chamber upon deenergization of said electromagnet.

9. A liquid measuring and dispensing device comprising a container for liquid to be measured having an open bottom portion having a cylindrical wall, a thermoplastic measuring chamber, an inlet into said chamber through the top thereof, an aligned outlet through the bottom of said chamber, a helically coiled armature guided for movement along said chamber, oppositely facing flexible valves supported by said armature in the center thereof in alignment with said inlet and said outlet, an electromagnet encircling said chamber and energizable to move said armature vertically therealong and engage one of said valves with said inlet and disengage the other of said valves from said outlet, and means for retaining said chamber in sealing engagement with said open portion of said container comprising a cover for said chamber engageable with an upper wall portion of said chamber, said cover having an annular wall registerable with the wall portion of said chamber and having a portion of a larger diameter than the wall portion of said chamber when in an unstressed condition and tapering toward its lower end to accommodate insertion of said cover within said chamber to expand the wall portion of said chamber into sealing engagement with said open bottom portion of said container, and said cover also having a handle extending upwardly therefrom above the level of liquid in said container and having at least one air passageway extending therealong, supplying air to said container to accommodate the flow of a measured volume of liquid through said outlet upon energization of said electromagnet and engagement of the uppermost of said valves with said inlet.

10. A liquid measuring and dispensing device particularly adapted to measure and dispense detergent for washing machines and the like comprising a thermoplastic wall defining a chamber, an electromagnet extending about said wall, a second wall formed integrally with said chamber wall, said second wall being molded about said electromagnet and waterproofing said electromagnet and accommodating said electromagnet to operate in the presence of water, and valve means within said chamber operable by said electromagnet upon energization thereof to effect the dispensing of a measured volume of liquid from the bottom of said chamber.

References Cited in the file of this patent

UNITED STATES PATENTS

| | | |
|---|---|---|
| 1,342,173 | Jaslin | June 1, 1920 |
| 2,216,347 | Humbard | Oct. 1, 1940 |

FOREIGN PATENTS

| | | |
|---|---|---|
| 714,705 | Germany | Dec. 4, 1941 |